Nov. 27, 1956 D. E. GRISWOLD 2,771,905
VALVE CLOSING SPEED CONTROL MEANS
Filed April 20, 1953 2 Sheets-Sheet 1
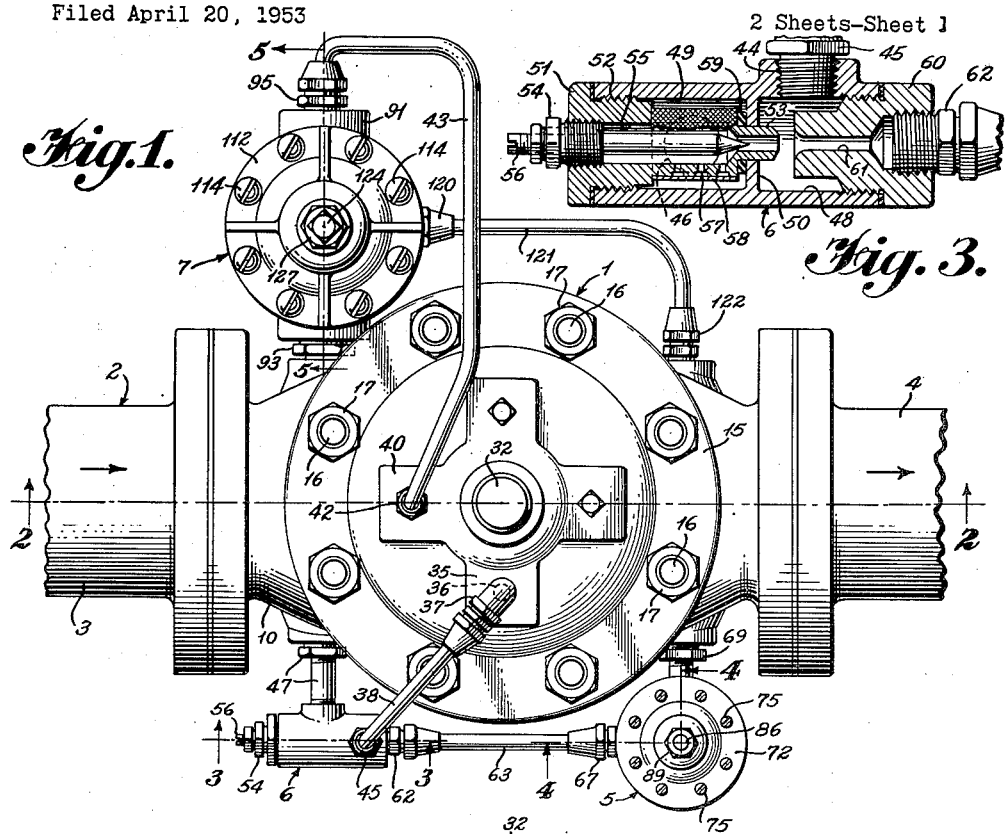
INVENTOR.
David E. Griswold
BY Bacon + Thomas
ATTORNEYS Nov. 27, 1956   D. E. GRISWOLD   2,771,905
VALVE CLOSING SPEED CONTROL MEANS
Filed April 20, 1953   2 Sheets-Sheet 2
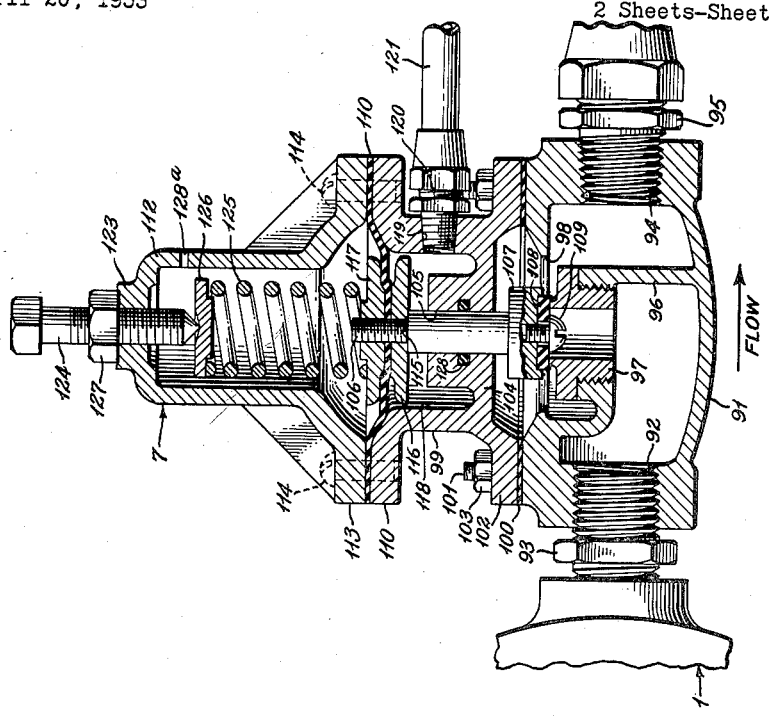
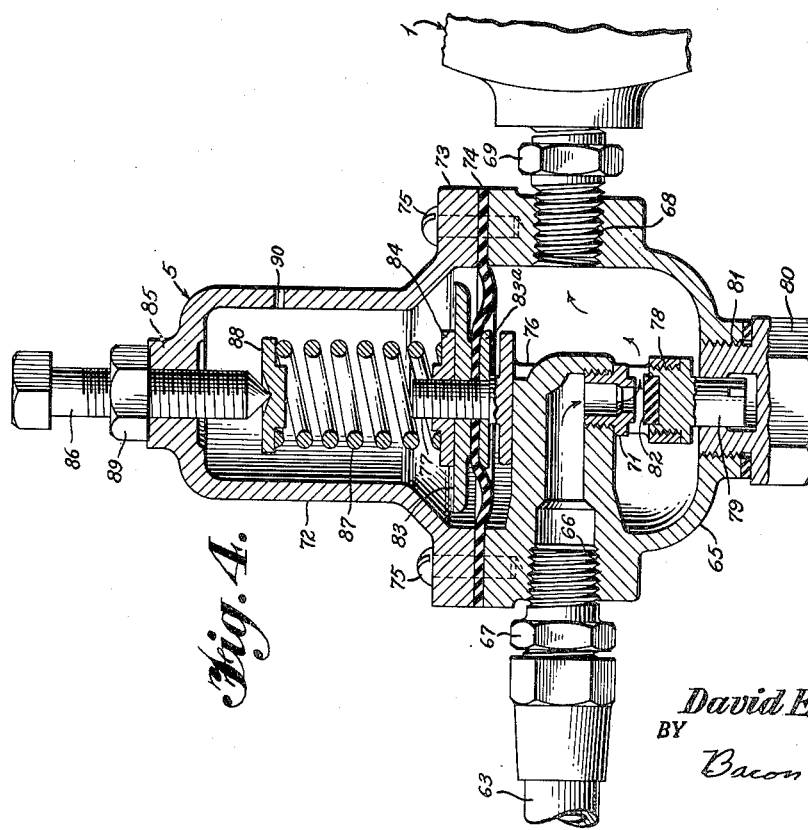
INVENTOR.
David E. Griswold
BY
Bacon & Thomas
ATTORNEYS

United States Patent Office 2,771,905
Patented Nov. 27, 1956

2,771,905

VALVE CLOSING SPEED CONTROL MEANS

David E. Griswold, San Marino, Calif., assignor to Donald G. Griswold, Alhambra, Calif.

Application April 20, 1953, Serial No. 349,790

7 Claims. (Cl. 137—488)

This invention relates to fluid flow control means and, more particularly, to means for controlling the closing speed of a main valve to maintain a substantially constant pressure in a pipeline subject to sudden variations in demand.

More specifically, the invention relates to a pressure regulating main valve adapted to be connected in a pipeline and equipped with means for controlling the opening and closing of said main valve in such a manner as to provide for sensitive regulation of the main valve at all times in response to pressure changes on the outlet side of the main valve.

The invention is particularly concerned with control means for a main valve that will provide very sensitive regulation of the main valve to cope with minor changes in pressure on the downstream side of the main valve and at the same time provide for quick closing of the main valve in the event of a sudden decrease in demand and a corresponding sudden substantial increase in pressure on the downstream side of the main valve.

The desired regulation of the main valve is obtained, in accordance with the principles of the present invention, through the use of a fluid pressure operated main valve and control means including an automatic pressure-responsive pilot valve which controls the supply of operating fluid to the main valve at a restricted rate through a needle valve and exhausts the operating fluid through an ejector at a relatively rapid rate for effecting sensitive control of the main valve, and an auxiliary pressure-responsive control valve provided to automatically supplement the supply of operating fluid to the main valve when the volume of operating fluid necessary to effect rapid closing of the main valve exceeds the capacity of the needle valve.

More specifically, the pilot valve may take the form of a normally open pressure regulating valve connected in a conduit arranged to bypass operating fluid around the pressure chamber of the main valve and which pilot valve is set to close and cause flow of operating fluid to the main valve through a branch conduit to effect gradual closing of the main valve when the pressure on the downstream side of the main valve is sufficient to overcome the set force which normally maintains the pilot valve open. The auxiliary control valve may take the form of a pressure relief valve set to open at a pressure slightly above the set pressure of the pilot valve, whereby the auxiliary valve will remain closed so long as the main valve operates sufficiently fast to maintain a downstream pressure equal to or slightly less than the pressure required to overcome the set force of the pilot valve. However, if there is a sudden substantial increase in the pressure on the downstream side of the main valve, such as may be caused by a sudden decrease in demand on the pipeline, and the downstream pressure rises and exceeds the setting of the pilot valve and also the slightly higher setting of the auxiliary valve, then the pilot valve will close and the auxiliary valve will open and provide a relatively large flow of operating fluid to the main valve to thereby supplement the flow of operating fluid through the needle valve to produce very rapid closing of the main valve. Both the pilot valve and the auxiliary valve are arranged to function in response to pressure conditions on the downstream side of the main valve, and for convenience in assembly of the valve and control means as a unit, both valves are connected with the outlet chamber of the main valve, although it is to be understood that these control valves can be connected to the pipeline itself on the downstream side of the main valve, if desired.

The pilot valve acting alone is incapable under certain conditions of effecting closing of the main valve as quickly as is desired in certain installations, although its presence is highly desirable because of the sensitivity with which it causes the main valve to respond when only slight variations in demand occur on the downstream side of the main valve. The auxiliary control valve overcomes the foregoing objection to using the pilot valve alone, in that it makes it possible for the main valve to be closed very quickly, should pressure conditions on the downstream side of the main valve require fast closing. As an illustration, under certain given pressure and flow conditions, a main valve equipped with the pilot valve, needle valve, strainer and ejector, required a closing time of 36 seconds. Under exactly the same pressure and flow conditions, but with the additional control provided by the auxiliary valve, the period required to effect closing of the main valve was reduced from 36 seconds to 3 seconds.

Accordingly, the principal object of the invention is to provide control means for a main valve that will assure sensitive operation and slow, gradual closing of the main valve against line pressure under slight variations in pressure and flow demand on the downstream side of the main valve, but which, nevertheless, is also capable of effecting extremely rapid closing of the main valve upon a sudden increase in pressure on the downstream side of the main valve.

Another object is to provide control means for a main valve that will effect the supply of operating fluid at a slow rate to the main valve until a given pressure condition exists on the downstream side of the main valve and thereafter, upon a further increase in downstream pressure, will supply operating fluid to the main valve at a relatively rapid rate to cause quick closing of the main valve.

Another object is to provide control means for a main valve including a control element that can be set to cause operating fluid to flow to the main valve at one rate in response to certain downstream pressure conditions, and including a second control element that can be set to cause operating fluid to flow to said main valve at a different rate in response to certain other downstream pressure conditions.

Another object is to provide pressure-responsive control means for a pressure fluid operable main valve that will bypass operating fluid around the main valve so long as line conditions require the main valve to be open, and which will interrupt the bypassing of operating fluid and cause it to flow to the main valve to effect closing of the main valve in response to given pressure conditions on the downstream side of the main valve.

Still another object is to provide control means for a main valve including a pressure-responsive pilot valve for controlling both the supply of operating fluid to, and the exhaust of operating fluid from, the main valve, together with means for effecting the rapid exhaust of operating fluid from the main valve to permit quick opening of the main valve by line pressure.

Other objects and features of the invention will be apparent from the following description taken in conjunction with the accompanying drawings, in which:

Fig. 1 is a plan view of a pipeline including a main valve having the automatic control means of the present invention associated therewith;

Fig. 2 is a longitudinal sectional view taken on the line 2—2 of Fig. 1;

Fig. 3 is a sectional view taken on the line 3—3 of Fig. 1 through the combined strainer, needle valve and ejector;

Fig. 4 is a sectional view taken on the line 4—4 of Fig. 1 through the automatic pilot valve which controls the bypassing of operating fluid as well as the exhaust of operating fluid from the main valve through the ejector, and the supply of operating fluid to the main valve through the needle valve; and Fig. 5 is a vertical sectional view taken on the line 5—5 of Fig. 1 through the auxiliary control valve which functions only to supply operating fluid to the main valve at a more rapid rate than is possible by the needle valve to effect quick closing of the main valve when required.

Referring now to Fig. 1, the numeral 1 generally identifies a pressure regulating, diaphragm-type main valve connected in a pipeline 2. The pipeline 2 comprises a pipe section 3 connected to the valve 1 on the inlet or upstream side thereof, and a pipe section 4 connected to said valve 1 on the outlet or downstream side thereof. The main valve 1 is controlled in part by an automatic pressure-responsive pilot valve 5 and a combined strainer, needle valve and ejector, all contained in a housing 6 and adapted to cooperate with said pilot valve to provide for very sensitive control of the main valve 1 in response to minor changes in pressure from a desired constant pressure on the downstream side of the main valve occasioned by variations in demand on the pipeline. The valve 5, as will be explained later, automatically controls both the supply and exhaust of operating fluid to and from the main valve 1 primarily in response to gradual or slight changes in pressure on the outlet or downstream side of said main valve. Further control of the main valve 1 is provided by an auxiliary, automatic pressure-responsive valve 7 adapted to supply only operating fluid under pressure to the main valve in the event of a sudden increase in pressure on the downstream side of the main valve which is too great to be quickly compensated for by the pilot valve 5. In other words, the valve 7 is adapted to supply operating fluid under pressure to the main valve 1, when necessary, at a much faster rate than such fluid can flow past the needle valve, so that when sudden closing movement of the main valve 1 is required to maintain the desired pressure condition on the downstream side of said main valve, operating fluid is supplied to the main valve through both the needle valve and the valve 7, all as will be fully explained later.

Referring now to Fig. 2, the main valve 1 comprises a body 10 provided with an inlet chamber 11 and an outlet chamber 12. A partition 13 in the valve body 10 separates the chambers 11 and 12 and serves as a support for an annular valve seat 14. A cover 15 is secured to the valve body 10 by a plurality of studs 16 and nuts 17, a conventional flexible diaphragm 18 being disposed between the valve body 10 and cover 15.

A diaphragm-supporting plate 19 is disposed in a central opening 10a in the body 10 below the diaphragm 18 and another supporting plate 20 is disposed in the cover 15 above said diaphragm. A valve stem 21 extends through the diaphragm 18 and its supporting plates 19 and 20 and is slidably mounted at its lower end in a guide 22 supported by arms 23 connected with the seat 14. The upper end of the valve stem 21 is guided in a bushing 24 mounted in a central pasageway 24a in the cover 15. The stem 21 has a shoulder 25 disposed above the guide 22, which serves as an abutment for a disc 26. The supporting plate 19 has an annular groove formed in the lower face thereof in which a sealing ring 27 is disposed and held in place by the outer marginal portion of the disc 26.

The stem 21 is threaded in the region of the plate 20 and a self-locking nut 28 is threaded thereon to secure the diaphragm 18, supporting plates 19 and 20, disc 26 and sealing ring 27 in assembled relation. The sealing ring 27 is cooperable with the seat 14 to control the flow of fluid through the main valve 1.

The central passage 24a is threaded at its outer end 30 and one end of a pipe nipple 31 is mounted therein. The other end of the pipe nipple 31 is closed by a pipe cap 32. A compression spring 33 is disposed within the pipe nipple 31 and its lower end is engaged with the upper end of the valve stem 21 and tends to close the main valve 1 against line pressure. The cover 15 has a cavity which cooperates with the diaphragm 18 to provide a pressure chamber 34 for operating fluid to effect downward flexing of the diaphragm 18 to move the valve stem 21 toward valve closing position.

The cover 15 has a laterally extending boss 35 (Fig. 1) provided with a threaded opening 36 in which a conventional fitting 37 is mounted. One end of a conduit 38 is connected to the fitting 37 and its other end is connected with the housing 6 to supply operating fluid to and to exhaust operating fluid from the pressure chamber 34, in a manner which will be described in greater detail hereinafter. The bushing 24 has passages 39 formed therein to establish communication between the pressure chamber 34 and the passage 30, so that the upper end of the valve stem 21 is subjected to the pressure in the pressure chamber 34.

The cover 15 has another radial boss 40 (Figs. 1 and 2) provided with a threaded opening 41 in which a conventional fitting 42 is mounted. One end of a conduit 43 is connected to the fitting 42 and its other end is connected with the pressure-responsive valve 7 for the sole purpose of supplying operating fluid under pressure to the chamber 34, in a manner and under conditions which will be described more fully hereinafter.

The housing 6 is shown in longitudinal cross-section in Fig. 3 and is provided with a threaded lateral opening 44 in which a conventional fitting 45 is mounted and connects the other end of the conduit 38 with the housing 6 (see Fig. 1). The housing 6 has a second lateral opening 46 (Fig. 3) connected by conventional pipe fittings 47 (Fig. 1) with the inlet chamber 11 of the main valve 1. The opening 44 communicates with a chamber 48 in the housing 6 and the opening 46 communicates with a chamber 49 in said housing, the chambers 48 and 49 being separated by a transverse wall 50. A strainer assembly 51 is mounted in a threaded opening 52 at the outer end of the chamber 49 and includes a nozzle portion 53 that extends through the wall 50 into the chamber 48. A plug 54 is mounted in the threaded outer end of a bore 55 in the strainer assembly 51 and carries an adjustable needle valve 56 having a conical end disposed adjacent the inlet of the orifice of the nozzle portion 53 for regulating the rate of flow of operating fluid from the inlet chamber 11 of the main valve 1 to the nozzle portion 53. The body of the strainer assembly 51 is provided with passageways 57 surrounded by a screen 58, which prevents foreign matter from passing into the bore 55 and through the nozzle 53. A gasket 59 surrounds the nozzle portion 53 and forms a seal between the wall 50 and the adjacent end of the body of the strainer 51.

The outer end of the chamber 48 is also threaded and a plug 60 is mounted therein. The plug 60 has a passageway 61 axially aligned with but spaced from the orifice of the nozzle portion 53, whereby the nozzle 53 and plug 60 function as an ejector for rapidly withdrawing operating fluid from the pressure chamber 34 of the main valve 1 through the conduit 38, when the valve 5 is open. The outer end of the passage 61 is enlarged and threaded for the reception of a conventional fitting 62 to which one end of a bypass conduit 63 (Fig. 1)

is connected, the other end of said conduit being connected to the valve 5, as will be presently described.

The valve 5 is illustrated in cross-section in Fig. 4 and comprises a body 65 having an inlet passage 66 which is threaded at its outer end and has a conventional fitting 67 mounted therein. The other end of the conduit 63 is connected to the valve 5 by the fitting 67. The valve body 65 also has a threaded outlet opening 68 which is connected by a conventional fitting 69 (Fig. 1) with the outlet chamber 12 of the main valve 1.

A partition 70 extends inwardly from the inlet opening 66 of the valve 5 and has an inverted seat 71 mounted thereon. A cover 72 has a flange 73 at its lower end that rests upon a flexible diaphragm 74 interposed between said flange and the adjacent face of the valve body 65. A plurality of screws 75 extend through openings in the flange 73 and diaphragm 75 and mount the cover 72 and diaphragm 74 in assembled, leak-proof relation on the body 65.

A yoke 76 surrounds the partition 70 and carries an upwardly projecting valve stem part 77 on its upper end. The yoke 76 has a threaded opening 78 at its lower end in which the upper end of another valve stem part 79 is mounted. The stem part 79 is slidably received and guided in a plug 80 mounted in a threaded opening 81 in the body 65. The stem part 79 is recessed on its upper end face to receive a valve disc 82 cooperable with the seat 71 to control the flow of operating fluid between the inlet opening 66 and the outlet opening 68 of the valve 5. The valve stem part 77 is threaded and extends through a central opening in the diaphragm 74 and through diaphragm washers 83 and 83ª disposed above and below said diaphragm. A nut 84 is threaded on the stem 77 for tightly clamping the diaphragm between the washer 83 and the washer 83ª.

The cover 72 has a threaded boss 85 in which an adjusting screw 86 is mounted. One end of a compression spring 87 is engaged with the nut 84 and its other end is engaged with a disc 88 in abutment with the inner end of the adjusting screw 86. A nut 89 is adapted to be jammed against the boss 85 to hold the screw 86 in adjusted position. The cover 72 has an opening 90 for venting the interior of said cover to the atmosphere.

The valve 5 is normally held open by the force of the compression spring 87. The screw 86 is adjusted to set the valve 5 so that it will automatically close when a predetermined fluid pressure is established in the pipe section 4 on the downstream side of the main valve 1. Thus, when the pressure on the outlet side of the main valve 1 acting upon the lower side of the diaphragm 74 exceeds the set force of the compression spring 87, the yoke 76 will be raised to engage the disc 82 with the seat 71 to close the valve. Conversely, when the pressure on the diaphragm 74 drops below the setting of the spring 87, the spring will move the yoke 76 downwardly to open the valve. Thus, the valve 5 will automatically open and close in accordance with pressure changes in the outlet chamber 12 of the main valve 1 corresponding to changes in demand on the downstream side of said main valve. The valve 5 can be easily adjusted to respond to any predetermined or set pressure within its range, simply by turning the adjusting screw 86. In one practical embodiment of the invention, the valve 5 may be set to close completely when the pressure on the outlet side of the main valve 1 exceeds 60 pounds per square inch.

The flow capacity of the valve 5 exceeds the maximum flow capacity of the nozzle 53 and needle valve 56, so that pressure cannot build up in the chamber 34 of the main valve 1 to effect closing of said main valve when the valve 5 is wide open. However, in the normal operation of the pipeline 2, the valve 5 will open more or less to permit operating fluid to be exhausted from the pressure chamber 34 of the main valve 1, or to be bypassed around said pressure chamber, when pressure conditions on the downstream side of said main valve require opening of the main valve, and will close or partially close to cause operating fluid under pressure to pass through the conduit 38 to build up pressure in the pressure chamber 34 to effect partial or complete closing of the main valve, as pressure conditions on the downstream side of said main valve require, in order to maintain a substantially constant pressure on the downstream side of the main valve insofar as the restricted flow of operating fluid through the needle valve 53—56 will permit. This flow is adequate to provide for very sensitive control of the main valve 1 so long as the changes in demand on the downstream side of the main valve are such that they can be compensated for by regulation of said main valve by operating fluid supplied at the restricted rate through the needle valve 53—56. In order to provide sensitive control and to also effect closing of the main valve 1 upon a sudden drop in demand requiring closing of the main valve 1 at a rate faster than can be effected by the flow of operating fluid through the needle valve 53—56, auxiliary control means has been provided for such purpose in the form of the automatic, normally closed, valve 7.

The valve 7 is shown in vertical cross-section in Fig. 5 and comprises a valve body 91 having a threaded inlet opening 92 connected by a conventional pipe fitting 93 (Fig. 1) with the inlet chamber 11 of the main valve 1. The body 91 also has a threaded outlet opening 94 in which a conventional fitting 95 is mounted to connect one end of the conduit 43 to the valve 7. A partition 96 in the body 91 separates the inlet and outlet openings 92 and 94 and serves as a support for an annular valve seat 97. The body 91 has a central opening 98 axially aligned with the seat 97. A generally spool-shaped intermediate valve section 99 is disposed above the valve body 91 and an annular gasket 100 is disposed between said valve section and body. A plurality of studs 101 is mounted in the body 91 and these extend through suitable openings in the gasket 100 and through a flange 102 at the lower end of the intermediate section 99. Nuts 103 are mounted on the studs 101 to secure the valve section 99, gasket 100, and the valve body 91 together in leak-proof relation. The intermediate section 99 has a transverse wall 104 provided with an opening 105 in which a valve stem 106 is slidably mounted. The valve stem 105 has a recessed enlargement 107 at its lower end and carries a valve disc 108 secured in place by a screw 109. The valve disc 108 is adapted to engage the valve seat 97 to shut off flow through the valve 7.

The intermediate section 99 also has a flange 110 at its upper end. A flexible diaphragm 111 overlies the flange 110, and a cover 112 has a flange 113 engaged with the upper side of said diaphragm. A plurality of screws 114 secure the cover 112 and diaphragm 111 to the flange 110.

The valve stem 106 has a shoulder 115 disposed above the transverse wall 104 adapted to form an abutment for a diaphragm-supporting washer 116 at the lower side of the diaphragm 111. A similar washer 117 is mounted upon the stem 106 above the diaphragm 111 and is internally threaded so that it also serves as a clamping nut for securing the diaphragm 111 to the valve 106. The cover 112 has a threaded boss 123 in which an adjusting screw 124 is mounted. A compression spring 125 is disposed within the cover 112 and its lower end is engaged with the washer 117 and its upper end is engaged with a disc 126 that bears against the inner end of the adjusting screw 124. A jam nut 127 locks the screw 124 in adjusted position.

The intermediate section 99 provides a pressure chamber 118 below the diaphragm 111 and a threaded opening 119 in a cylindrical wall of said section communicates with said pressure chamber. A conventional fitting 120 is mounted in the opening 119 and connects one end of a conduit 121 to the intermediate section 99. In Fig. 5, the fitting 120 is shown 90° out of phase with the location thereof indicated in Fig. 1, and this has been done solely in the interest of facilitating illustration. The opposite end of the conduit 121 is connected by a conventional fitting 122 (Fig. 1) with the outlet chamber 12 of the main valve 1. An O-ring packing 128 is mounted in the transverse wall 104 and forms a seal around the valve stem 106 between the outlet chamber of the valve body 91 and the pressure chamber 118. The housing 112 has a vent opening 128ª which subjects the upper side of the diaphragm 111 to atmospheric pressure.

It will be apparent from Figs. 1 and 5 that the pressure in the outlet chamber 12 of the main valve 1 is communicated through the conduit 121 to the pressure chamber 118 of the valve 7, so that the valve 7 is automatically responsive to pressure changes on the downstream side of said main valve. The screw 124 may be adjusted for any desired set pressure within the capacity of the valve 7, but preferably is adjusted so that spring 125 is set to provide a force that will allow opening of the valve 7 when the pressure in the outlet chamber 12 of the main valve is a few pounds, for example, 3 to 5 pounds, above that at which the valve 5 is set to close, so that the valve 5 will always be closed before the valve 7 opens.

It will be understood from the foregoing that while fluid, either liquid or gas, is flowing through the pipeline 2, the valve 5 will normally open and close more or less to control the supply and exhaust of operating fluid to the pressure chamber 34 of the main valve to allow opening and closing, or modulation, of the main valve as required in order to maintain a substantially constant pressure in the pipe section 4 on the downstream side of said main valve. Variations in demand on the pipe section 4 will naturally result in variations in pressure in said pipe section and such pressure variations are communicated to the outlet chamber 12 of the main valve 1 and automatically actuate the pilot valve 5 to permit opening or closing movement of the main valve 1 in a manner to render said main valve quite sensitive in response to minor pressure variations from the desired pressure in the pipe section 4. Should pressure conditions in the pipe section 4 require quick opening of the main valve 1 to build up pressure in the pipe section 4, the valve 5 will be opened quickly by the spring 87 so that the flow of fluid from the inlet chamber 11 of the main valve through the nozzle 53 and orifice 61 will produce an ejector action for quickly exhausting operating fluid from the chamber 34 to permit opening movement of the main valve 1 by line pressure. It will be understood that when the valve 5 is open, operating fluid will be by-passed from the inlet chamber 11 to the outlet chamber 12 of the main valve 1 through the conduit 63 and valve 5, instead of flowing to the pressure chamber 34 through the conduit 38. Should pressure conditions in the pipe section 4 gradually change, that is, gradually increase, and require gradual closing of the main valve 1, the pilot valve 5 will close gradually, thereby obstructing the flow of operating fluid through the valve 5 and causing operating fluid to flow through the conduit 38 to the pressure chamber 34 to act on the diaphragm 18 to move the valve stem 21 toward closed position. At such time, the flow of operating fluid to the chamber 34 is restricted by the needle valve 56, thus requiring the main valve 1 to gradually close.

On the other hand, if there is a sudden decrease in the flow demand on the pipe section 4 and pressure suddenly builds up in said pipe section, requiring quick closing of the main valve 1, the valve 5 will close as soon as the pressure on the downstream side of the main valve 1 exceeds the set pressure of the valve 5 and thus immediately start closing of the main valve 1 by restricted flow of operating fluid through the conduit 38 to the pressure chamber 34 of the main valve, and the valve 7 will open and permit operating fluid to simultaneously flow from the inlet chamber 11 of the main valve 1 at a relatively much greater rate through the conduit 43 to said pressure chamber to thereby effect quick closing of the main valve 1.

The main valve 1 will remain closed so long as the pressure in the pipe section 4 exceeds the pressure for which the valve 7 has been set. Should the demand on pipe section 4 be resumed, the pressure on the downstream side of the main valve will correspondingly drop and when said pressure drops below that for which the valve 7 has been set, it will close so that operating fluid will no longer flow through the conduit 43; and when the pressure in the pipe section 4 drops below the set pressure of the valve 5, it will open to allow operating fluid to exhaust through the conduits 38 and 63 to permit the main valve 1 to open and allow flow to the pipe section 4.

It will be understood that the valves 5 and 7 may be set to operate on any desired difference in pressures, depending upon the operating conditions to be met in practice. It will also be understood that various changes may be made in the details of construction and in the arrangement of the parts of the main valve 1 and the control valves 5 and 7, as well as in the details of construction and arrangement of the strainer ejector, and needle valve assembly, without departing from the principles of the invention or the scope of the annexed claims.

I claim:

1. Control means for controlling the closing speed of a fluid pressure operable, pressure regulating, main valve comprising, in combination with said main valve: a first pressure-responsive means operable in response to pressure changes on the downstream side of said main valve for controlling the supply and exhaust of operating fluid to said main valve in accordance with minor variations in pressure from a desired pressure on said downstream side of said main valve to maintain a substantially constant pressure on the downstream side of said main valve; and a second pressure-responsive means, responsive to relatively higher pressures on the downstream side of said main valve, for supplying operating fluid to said main valve at a substantially greater rate than said first-mentioned means for effecting relatively quick closing of said main valve upon an increase in pressure on the downstream side of said main valve in excess of that required to cause said first pressure-responsive means to supply operating fluid to said pressure chamber.

2. In combination: a fluid pressure operable main valve for maintaining a substantially constant given pressure in a pipeline on the downstream side of said main valve; means controlling the supply and exhaust of operating fluid to said main valve, said means being responsive to variations in pressure below the desired constant pressure on the downstream side of said main valve and being operable to effect the supply of operating fluid to said main valve to effect closing thereof at a slow rate as the downstream pressure tends to exceed said given pressure and to exhaust operating fluid from said main valve to allow opening of said main valve as the downstream pressure drops below said given pressure; and auxiliary control means operable in response to a substantial increase in pressure on the downstream side of said main valve above said given pressure for supplying operating fluid to said main valve at a relatively greater rate than said first-mentioned means to effect rapid closing of said main valve.

3. In combination: a pressure fluid operable main valve for controlling flow of fluid in a pipeline to maintain a desired substantially constant pressure in said pipeline; control means connected with said main valve operable to supply operating fluid thereto for effecting slow closing of said main valve in response to a slight increase in pressure in said pipeline above said desired pressure; and control means connected with said main valve operable to supply operating fluid thereto simultaneously with said first-mentioned control means for effecting relatively quick closing of said main valve upon a relatively great increase in pressure in said pipeline above said desired pressure.

4. The combination defined in claim 3, wherein the first-mentioned control means includes means for bypassing operating fluid around said main valve and is an automatic pressure responsive valve that closes to prevent said bypassing of operating fluid in response to said slight increase in pressure above the desired pressure; and the second-mentioned control means is an automatic valve that opens in response to said relatively great increase in pressure.

5. In combination: a pressure fluid operable main valve for controlling flow of fluid in a pipeline to maintain a desired substantially constant pressure in said pipeline; a control valve connected with said main valve operable to supply operating fluid thereto and set to require a given force to operate the same to control the supply of operating fluid to said main valve in response to a slight increase in pressure in said pipeline above said desired pressure; and a second control valve connected with said main valve operable to supply operating fluid thereto simultaneously with said first-mentioned control valve and being set to require a force slightly greater than said given force for effecting relatively quick closing of said main valve upon a relatively great increase in pressure in said pipeline above said desired pressure.

6. In combination, a fluid pressure operable main valve; a first pressure-responsive control valve connected with said main valve and set to require a given pressure to operate the same to cause operating fluid to be supplied to said main valve at a slow rate when the pressure at one side of said main valve exceeds said force; and a second pressure-responsive control valve also connected with said main valve and set to require a given pressure to operate the same greater than that required to operate said first-mentioned control valve to cause operating fluid to be supplied to said main valve at a relatively fast rate when the pressure at said one side of said main valve exceeds the setting of said second control valve.

7. In combination, a fluid pressure operable main valve having an inlet, an outlet, closure means for controlling flow between said inlet and outlet, and means including a pressure chamber and pressure-responsive means for controlling the movement of said closure means; a housing having a passageway connected with said inlet of said main valve; a branch conduit for conducting operating fluid from said passageway to the pressure chamber of said main valve; a normally open pressure-responsive pilot valve having an inlet and an outlet; bypass conduit means connecting said passageway with the inlet of said pilot valve; means connecting the outlet of said pilot valve with the outlet of said main valve, whereby operating fluid can be bypassed around said pressure chamber so long as said pilot valve is open; means controlling flow between the inlet and outlet of said pilot valve comprising a diaphragm subject to the pressure in the outlet of said main valve; means applying a set force to said diaphragm opposing closing of said pilot valve, whereby when the pressure in the outlet of the main valve is less than said set force, said pilot valve will remain open and permit the exhaust of operating fluid from said pressure chamber of said main valve and the bypassing of operating fluid around said pressure chamber to the outlet of said main valve, and when the pressure in the outlet of said main valve is greater than said set force, the pilot valve will close and operating fluid under pressure will flow from the inlet of said main valve through said passageway and branch conduit to the pressure chamber of said main valve to cause said main valve to close; a normally closed auxiliary pressure-responsive control valve having an inlet and an outlet; means connecting the inlet of said main valve with the inlet of said auxiliary control valve; means connecting the outlet of said auxiliary control valve with said pressure chamber of said main valve, whereby operating fluid will be supplied to said main valve when said auxiliary control valve is open; means controlling the flow between the inlet and outlet of said auxiliary control valve comprising a diaphragm subject to the pressure in the outlet of said main valve; and means applying a set force to the diaphragm of said auxiliary control valve greater than the set force of said pilot valve and opposing opening of said auxiliary control valve until after said pilot valve has been closed, whereupon operating fluid will be simultaneously supplied to the pressure chamber of said main valve under the control of both said pilot valve and said auxiliary control valve.

References Cited in the file of this patent
UNITED STATES PATENTS

| | | |
|---|---|---|
| 1,311,536 | Smoot | July 29, 1919 |
| 2,059,121 | Lake | Oct. 27, 1936 |
| 2,226,761 | Fox | Dec. 31, 1940 |